United States Patent
Furusako (10) Patent No.: US 10,933,488 B2
(45) Date of Patent: Mar. 2, 2021

(54) METHOD OF RESISTANCE SPOT WELDING (71) Applicant: NIPPON STEEL & SUMITOMO METAL CORPORATION, Tokyo (JP)

(72) Inventor: Seiji Furusako, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 297 days.

(21) Appl. No.: 15/769,812

(22) PCT Filed: Oct. 21, 2016

(86) PCT No.: PCT/JP2016/081352
§ 371 (c)(1),
(2) Date: Apr. 20, 2018

(87) PCT Pub. No.: WO2017/069268
PCT Pub. Date: Apr. 27, 2017

(65) Prior Publication Data
US 2019/0240768 A1  Aug. 8, 2019

(30) Foreign Application Priority Data

Oct. 21, 2015 (JP) .............................. JP2015-207128

(51) Int. Cl.
*B23K 11/16* (2006.01)
*B23K 11/11* (2006.01)
*B23K 11/25* (2006.01)

(52) U.S. Cl.
CPC ............... *B23K 11/16* (2013.01); *B23K 11/11* (2013.01); *B23K 11/115* (2013.01); *B23K 11/255* (2013.01); *B23K 11/257* (2013.01)

(58) Field of Classification Search
CPC ....... B23K 11/16; B23K 11/11; B23K 11/115; B23K 11/255; B23K 11/257;
(Continued)

(56) References Cited

U.S. PATENT DOCUMENTS 5,484,975 A * 1/1996 Itatsu .................... B23K 11/115
219/86.7
2016/0067913 A1  3/2016 Draht et al.

FOREIGN PATENT DOCUMENTS

JP  2010-110816 A  5/2010
JP  2010-240740 A  10/2010
(Continued)

*Primary Examiner* — Tu B Hoang
*Assistant Examiner* — Diallo I Duniver
(74) *Attorney, Agent, or Firm* — Birch, Stewart, Kolasch & Birch, LLP (57) ABSTRACT

A resistance spot welding method able to form a welded joint having delayed fracture resistance, includes, in order, applying a pressing force P1 (kN) to the plurality of steel sheets by welding electrodes while supplying a supplied current I1 (kA), while applying the pressing force P1, supplying a current Ic (kA) during a cooling time tc (s), repeating two times or more a pressure force raising and lowering cycle of supplying a supplied current I2 (kA) to the welding electrodes while applying a pressing force P2 (kN) to the plurality of steel sheets by the welding electrodes during a pressing time tf (s), then immediately applying a pressing force P3 (kN) during a pressing time ti (s), applying the pressing force P2 during the pressing time tf, and releasing the pressing force and ending the supply of current, satisfying $0 \leq Ic < I1$, $0.3 \leq I2/I1 < 1.0$, $P2/P1 \geq 2$, $tf \leq 0.2$, $P3 < P2$, and $ti \leq 0.2$.

1 Claim, 3 Drawing Sheets

(58) Field of Classification Search
CPC ......... B23K 11/311; B23K 1/00; B23K 11/24;
B23K 103/04; B23K 11/241; B23K
2101/04; B23K 11/25; B23K 11/002;
B23K 11/31; B23K 11/185; B23K 11/20;
B23K 2101/18; B23K 2101/006; B23K
2103/04; B23K 2101/34; B23K 35/0205;
B23K 35/0261; B23K 11/30; B23K
11/166; B23K 11/14; B23K 11/252;
B23K 2103/10; B23K 11/3054; B23K
11/00; B23K 11/34; C09J 2400/163;
B32B 15/011; B32B 15/01; C22C 38/06;
G05B 2219/45135
USPC .... 219/76.16, 78.01, 80–87, 89–91.2, 91.22,
219/108–111, 117 R, 117.1; 428/544,
428/594, 600; 403/271
See application file for complete search history.

(56) References Cited

FOREIGN PATENT DOCUMENTS

| | | | | |
|---|---|---|---|---|
| JP | 2010-247215 A | 11/2010 | | |
| JP | 2013-71124 A | 4/2013 | | |
| WO | WO 2007/077393 A2 | 7/2007 | | |
| WO | WO 2014/173472 A1 | 10/2014 | | |
| WO | WO-2014171495 A1 * | 10/2014 | ............. | B23K 11/16 |
| WO | WO-2015070959 A1 * | 5/2015 | ............. | B23K 11/34 |

* cited by examiner

METHOD OF RESISTANCE SPOT WELDING

FIELD

The present invention relates to a resistance spot welding method of high strength steel sheets, more particularly relates to a resistance spot welding method in auto parts, car bodies, etc.

BACKGROUND

In the field of automobiles, for environmental protection, improvement of the fuel efficiency by reduction of the weight of car bodies and improvement of collision safety are being sought. For this reason, various attempts have been made up to now to use high strength steel sheets to reduce thicknesses and optimize car body structures so as to lighten car bodies and improve collision safety.

In welding in the manufacture of parts for automobiles or the assembly of car bodies, resistance spot welding (below, sometimes also referred to as "spot welding") is mainly being used. As indicators of the quality of a welded joint formed by spot welding, there are the tensile strength and fatigue strength. The tensile strength of a welded joint includes the tensile shear strength (TSS) measured by applying a tensile load in the shear direction and the cross tensile strength (CTS) measured by applying a tensile load in the transverse direction. Further, the fatigue strength of a welded joint includes the tensile shear fatigue strength measured by applying a tensile load in the shear direction and the cross tensile fatigue strength measured by applying a tensile load in the transverse direction.

On the other hand, when spot welding high strength steel sheets, there is the problem of delayed fracture (hydrogen embrittlement). This delayed fracture is mainly governed by the three factors of the hardness of the steel sheets, residual stress, and the amount of hydrogen in the steel sheet.

High strength steel sheets contain large amounts of elements with high hardenability for achieving strength such as Si, Mn, etc. in addition to C. The weld zone of a welded joint formed by spot welding high strength steel sheets is hardened through the heating and cooling process of the welding, becomes a martensite structure, and becomes hard. Further, at the weld zone, due to the locally occurring expansion and contraction in transformation, the tensile residual stress of the welded joint becomes larger.

For this reason, the weld zone of a welded joint formed by spot welding high strength steel sheets becomes high in hardness and large in tensile residual stress, so is a location where delayed fracture easily is caused if hydrogen penetration occurs. If such delayed fracture occurs, a sufficient strength cannot be achieved in the above-mentioned quality indicators of a welded joint of tensile strength and fatigue strength. Further, if moisture penetrates that part (crack), the problem arises that corrosion occurs and the strength further falls. These problems are some of the reasons obstructing the reduction of weight of car bodies (reduction of thickness) by use of high strength steel sheets.

In view of this situation, it is known in the art to supply a tempering current after the elapse of a predetermined time from the end of supply of current in spot welding, to heat the weld zone by a high frequency, or to temper the weld zone to lower the hardness of the weld zone. However, in this art, the welding process becomes longer so the productivity falls, the tempering causes the weld zone to soften and peeling and fracture to easily occur inside the weld metal (nugget), etc.

As opposed to this, PLT 1 discloses the art of raising the later pressing force by the welding electrodes during the holding time after the end of the welding time over the initial pressing force by the welding electrodes at the time of formation of the nugget by spot welding so as to introduce compressive residual stress around the weld zone.

CITATION LIST

Patent Literature

PTL 1: Japanese Patent Publication No. 2010-110816A

SUMMARY

Technical Problem

The art disclosed in PLT 1 is art effective for suppressing delayed fracture so as to reduce the tensile residual stress of a weld zone, but further suppression of delayed fracture has been desired.

The present invention, in consideration of such a situation, has as its object the provision of a resistance spot welding method able to stably form a welded joint having high resistance to delayed fracture.

Solution to Problem

The inventors studied in depth the means for solving the above problem. The inventors thought that to improve the delayed fracture resistance of a spot welded joint, it was extremely important to reduce the tensile residual stress around the weld zone. Therefore, they studied the pressing conditions of the weld zone by the welding electrodes after formation of the nugget affecting the tensile residual stress around the weld zone.

As a result, they discovered that by supplying current after formation of the nugget while repeating a cycle of raising and lowering the pressing force on the weld zone (below, called "peening"), it is possible to hold the temperature around the nugget at a high temperature while applying impact and promote the plastic deformation near the nugget. As a result, it is possible to reduce the tensile residual stress of the end of the nugget or change it to compressive stress and possible to improve the delayed fracture resistance of the welded joint.

The present invention was made based on the above discovery and has as its gist the following:

A method of resistance spot welding a plurality of steel sheets with at least overlapping welding locations, the plurality of steel sheets including at least one steel sheet with a tensile strength of 980 or more, the method comprising the steps of, in order, [A] applying a pressing force P1 (kN) to the plurality of steel sheets by welding electrodes while supplying a current I1 (kA); [B] supplying a current Ic (kA) during a cooling time tc (s), while applying the pressing force P1; [C] repeating at least two times a pressing force raising and lowering cycle of supplying a current I2 (kA) to the welding electrodes while applying a pressing force P2 (kN) to the plurality of steel sheets by the welding electrodes during a pressing time tf (s), then immediately applying a pressing force P3 (kN) during a pressing time ti (s); [D] applying the pressing force P2 during the pressing time tf; and [E] releasing the pressing force and ending the supply of current, wherein the supplied current Ic satisfies the following formula (1), the supplied current I2 satisfies the following formula (2), the pressing force P2 satisfies the following formula (3), the pressing time tf satisfies the following formula (4), the pressing force P3 satisfies the following formula (5), and the pressing time ti satisfies the following formula (6):

$$0 \leq Ic < I1 \quad (1)$$

$$0.3 \leq I2/I1 \leq 1.0 \quad (2)$$

$$P2/P1 \geq 1.2 \quad (3)$$

$$tf \leq 0.2 \quad (4)$$

$$P3 < P2 \quad (5)$$

$$ti \leq 0.2 \quad (6)$$

Advantageous Effects of Invention

According to the present invention, after formation of the nugget, the weld zone is peened, so it is possible to improve the resistance to hydrogen embrittlement of the welded joint.

BRIEF DESCRIPTION OF DRAWINGS

FIGS. 3A and 3B are views schematically showing a change in the current density when changing the pressing force of the welding electrodes, wherein FIG. 3A shows the prior art, while FIG. 3B shows the present invention.

DESCRIPTION OF EMBODIMENTS

The resistance spot welding method of the present invention (below, referred to as the "welding method of the present invention") is a method of welding a plurality of steel sheets including at least one steel sheet having a tensile strength of 980 MPa or more by resistance spot welding in which, after formation of the nugget, peening is performed repeating the cycle of raising and lowering the pressing force on the weld zone by the welding electrodes.

Further, the pressing force at the time of nugget formation is made P1 (kN), the supplied current is made I1 (kA), and the cooling time is made tc (s). To satisfy the following formula (1), the supplied current in the cooling time is made Ic (kA). In the peening, to satisfy the following formulas (2) to (5), the supplied current is made I2 (kA), the pressing force at time of rise of the pressing force is made P2 (kN), the pressing time is made tf (s), the pressing force at time of fall of the pressing force is made P3 (kN), and the pressing time is made ti (s):

$$0 \leq Ic \leq I1 \quad (1)$$

$$0.3 \leq I2/I1 < 1.0 \quad (2)$$

$$P2/P1 \leq 0.2 \quad (3)$$

$$tf \leq 0.2 \quad (4)$$

$$P3 < P2 \quad (5)$$

$$ti \leq 0.2 \quad (6)$$

Next, the flow of the welding method of the present invention will be explained and the basic configuration of the welding method of the present invention will be explained.

Figure 1:
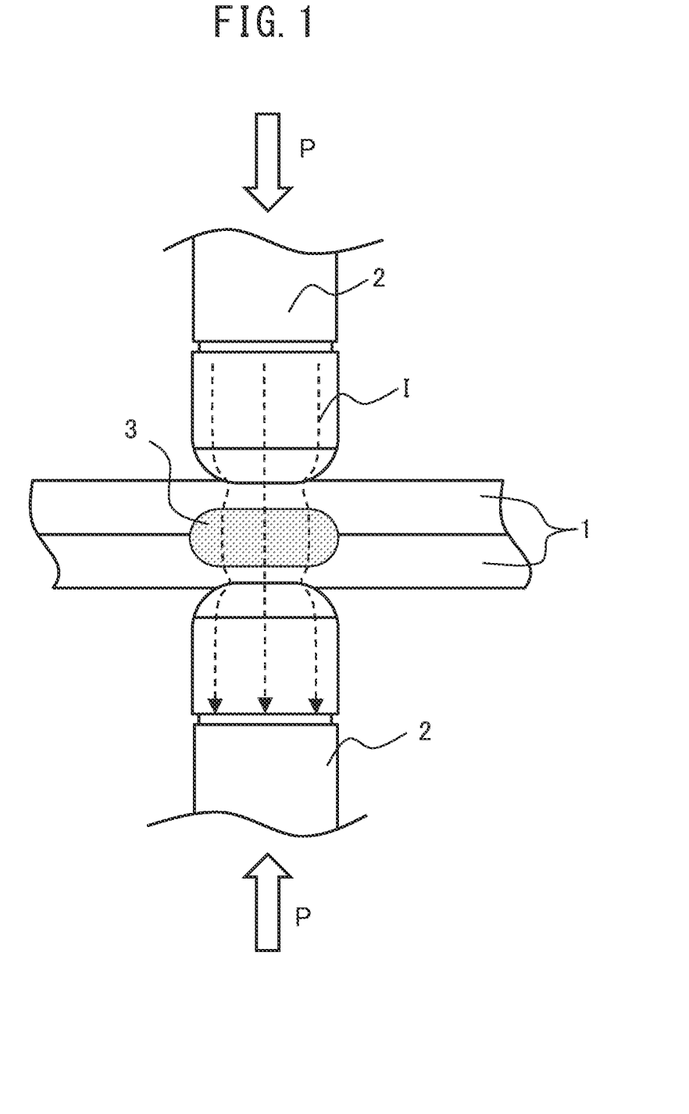
FIG. 1 is a view schematically showing a welding method of the present invention.

FIG. 1 shows an outline of the welding method of the present invention. FIG. 1 is a cross-sectional view of parts to be welded cut along the thickness direction. First, in the method of the present invention, as the parts to be welded, a plurality of steel sheets (below, also referred to as the "set of sheets") is prepared. The set of sheets include at least one steel sheet with a tensile strength of 980 MPa or more (below, also referred to as a "high strength steel sheet").

Further, as shown in FIG. 1, two steel sheets 1 are set overlapping, welding electrodes 2 made of copper alloy etc. are used so as to clamp the welding locations of the two steel sheets from the two sides, and these are used to apply a pressing force P of P1 (kN) while current I of I1 (kA) is supplied to form molten metal. After that, while applying the pressing force P1, during the cooling time tc (s), the supplied current is made Ic (kA), heat is removed by the water-cooled welding electrodes 2, and heat is conducted to the steel sheets themselves, whereby a weld metal (nugget) 3 with an elliptical cross-sectional shape is formed between the two steel sheets 1.

If the set of sheets includes one or more high strength steel sheets, the weld zone of the welded joint obtained by spot welding and the heat affected zone of the nugget 3 and its surroundings are hardened during the cooling process and become a martensite structure. Further, heat shrinkage occurs during the cooling process. In particular, the end of the nugget 3 becomes a state with residual tensile stress.

Therefore, in the welding method of the present invention, after formation of the nugget by spot welding, a current I of I2 (kA) is supplied while peening is performed by repeating at least two times a pressing force raising and lowering cycle of applying a pressing force P of P2 (kN) during the pressing time tf (s), then immediately applying a pressing force P of P3 (kN) during the pressing time ti (s). Next, the pattern of pressing force and supplied current of the welding electrodes at the time of spot welding and peening will be explained.

Figure 2:
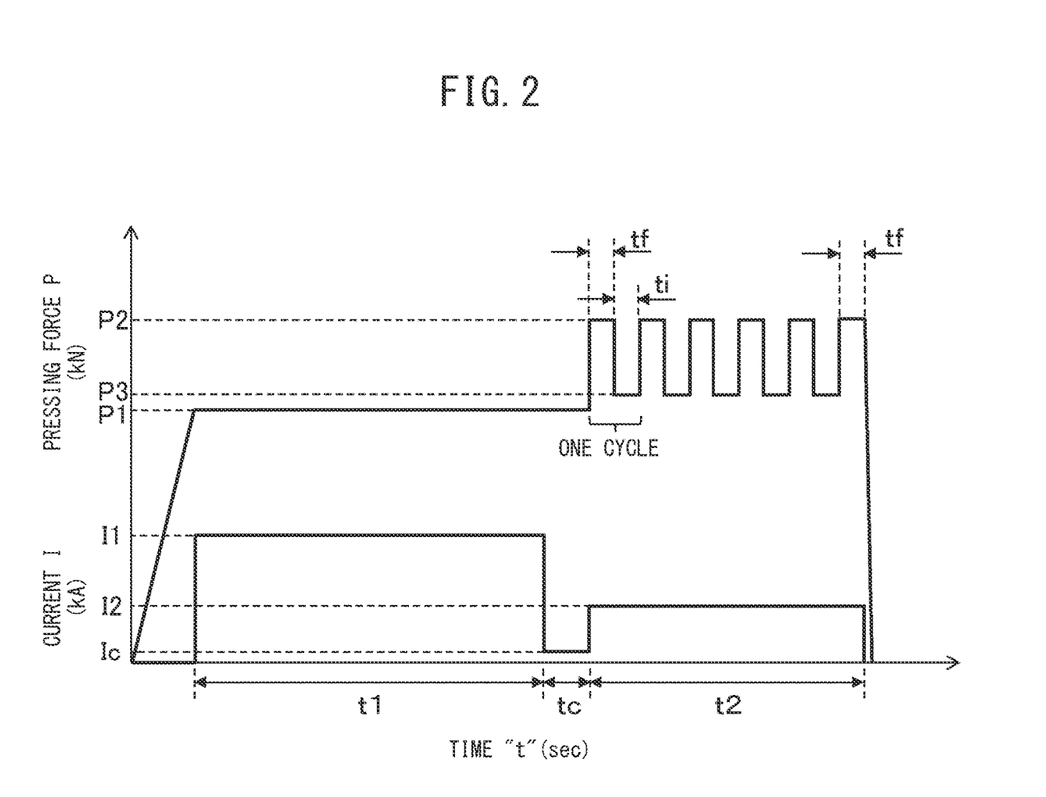
FIG. 2 is a view showing an example of the pattern of the pressing force and supplied current of the welding electrode.

FIG. 2 shows an example of a pattern of the pressing force and supplied current of the welding electrodes. First, the pattern of the pressing force and supplied current at the time of spot welding forming a nugget will be explained. The steel sheets are pressed by the welding electrodes by a pressing force of P1. After the pressing force reaches P1, the current value is made the current I1. This state is held for the welding time t1 (s) to form the molten metal.

After the elapse of the welding time t1, while applying the pressing force P1, during the cooling time tc, the supplied current is made Ic and the molten metal is cooled and solidified to form the weld metal (nugget). At this time, the supplied current Ic is set so as to satisfy the above formula (1).

Next, the pattern of the pressing force and supplied current at the time of peening will be explained. After the elapse of the cooling time tc, the current value is made the supplied current I2. The supplied current I2 is set so as to satisfy the above (2). Further, using the supplied current I2, this state is held during the welding time t2 (s) to perform the peening.

Further, the supplied current I2 starts to be supplied and the pressing force P2 is applied by the welding electrodes during the pressing time tf. At this time, the pressing force P2 is set so as to satisfy the above formula (3) while the pressing time tf is set so as to satisfy the above formula (4).

After the elapse of the pressing time tf, immediately the pressing force P3 is applied during the pressing time ti. At this time, the pressing force P3 is set so as to satisfy the above formula (5) while the pressing time ti is set so as to satisfy the above formula (6). This rise of the pressing force by the pressing force P2 and fall of the pressing force by the pressing force P3 is defined as one cycle and the cycle repeated two or more times.

After repeating this pressing force raising and lowering cycle, the pressing force P2 is applied during the pressing time tf, then the pressing force is released and the current supply is ended. At this time, the pressing force P2 is set so as to satisfy the above formula (3) and the pressing time tf is set so as to satisfy the above formula (4).

By performing peening after formation of the nugget in this way, the delayed fracture resistance of the welded joint can be improved and further the fatigue strength can be improved. The reason for the improvement of the delayed fracture resistance is not clear, but it is believed that by peening the weld zone at a certain temperature, that is, by repeatedly raising and lowering the pressing force, the weld zone is given plastic deformation and the tensile residual stress can be reduced like for example by pressing by a platen after welding or by ultrasonic impact treatment.

Figure 3:
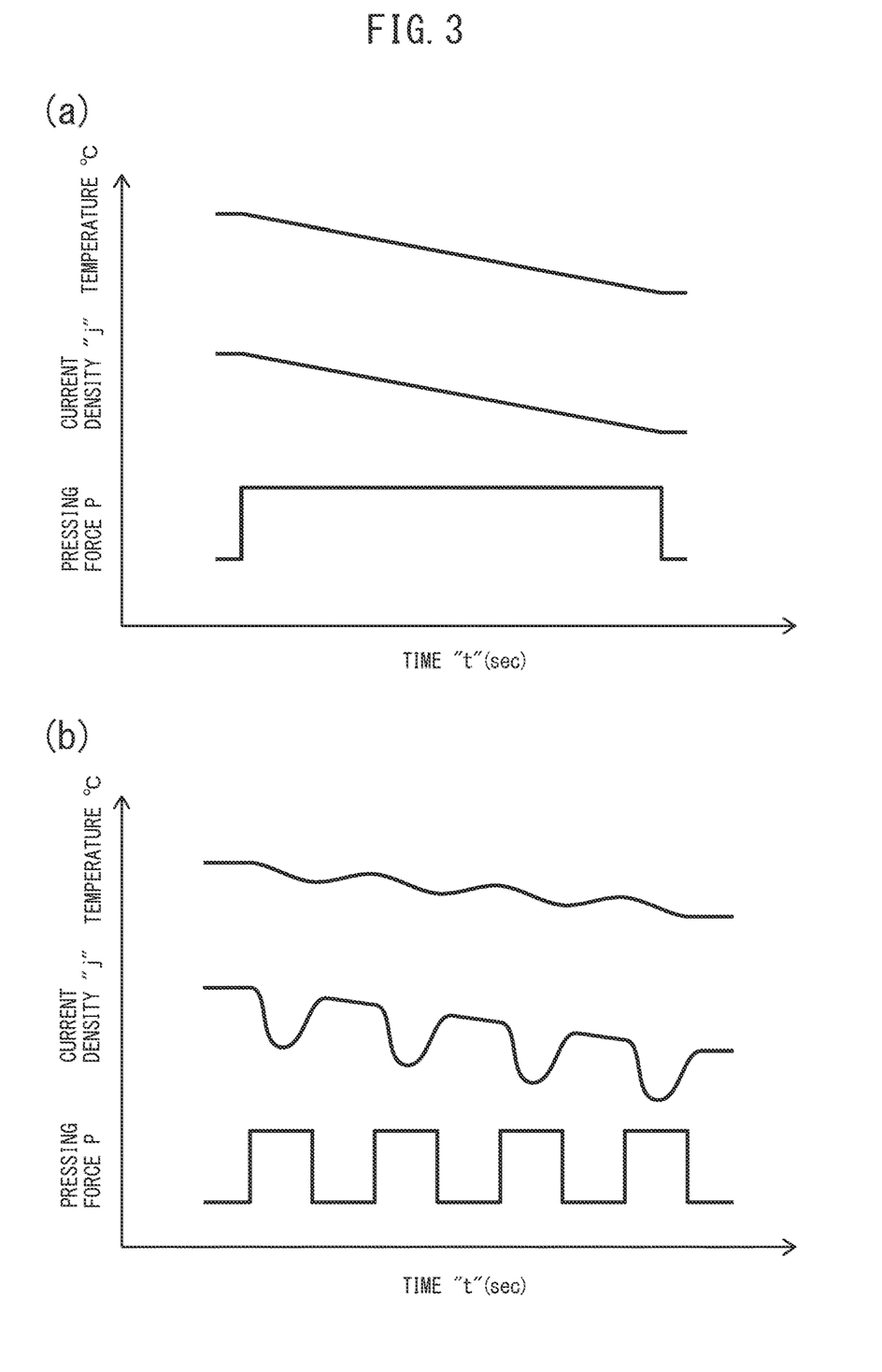

FIGS. 3A and 3B show outlines of the change in current density as seen from the materials and the change of temperature around the nugget at the time of pressing the parts to be welded by the welding electrodes. FIG. 3A shows the case of making the pressing force constant, while FIG. 3B shows the case of repeating the pressing force raising and lowering cycle. If making the pressing force constant like in FIG. 3A, the plastic deformation of the parts to be welded becomes larger along with the elapse of time, while the current density monotonously decreases. As a result, the temperature around the nugget also gradually falls along with the change of the current density.

On the other hand, if repeatedly raising and lowering the pressing force like in FIG. 3B, the current density also rises and falls along with that. As a result, the temperature around the nugget also changes as the current density changes. Due to this, it is possible to maintain the temperature around the nugget in a certain range.

Note that, the current density of FIG. 3A is an image of the case of using a DC power supply. In the case of an AC power supply, the current increases and decreases during supply, so a current density such as described in FIG. 3B is obtained, but the pressing force is constant, so the tensile residual stress of the weld zone cannot be reduced or cannot be made compressive stress.

Further, in the case of FIG. 3A, after the welding electrodes contact the parts to be welded, a specific location continues to be pressed, so strain occurs at the specific location. On the other hand, in the case of FIG. 3B, the pressing force rises and falls, so the plastic deformation of the weld zone becomes uniform.

The resistance spot welding method in the present embodiment supplies the current I2 at the time of peening, so the weld zone becomes high in temperature and yield strength is reduced and plastic deformation at the time of peening becomes easy. By repeatedly raising and lowering the pressing force at this time to make the current density rise and fall, it is possible to hold the temperature around the nugget within a temperature range facilitating plastic deformation even while repeating the cycle of increasing and decreasing the pressing force to the parts to be welded a plurality of times. For this reason, it is believed that the reduction of the tensile residual stress is promoted.

Furthermore, since increasing and decreasing the pressing force at the time of peening, the contact area of the electrodes and weld zone increases and decreases. The load per contact area, that is, the stress, locally increases or decreases in the state where the current density, that is, the temperature, is in a suitable range, so the plastic deformation is believed to proceed more. In addition, it is guessed that the weld zone becomes finer in structure, parts where embrittlement elements solidify and segregate are split, etc. and the delayed fracture resistance is improved.

The present invention has the above such basic configuration. The necessary requirements and preferable requirements of the present invention will be further successively explained.

Plurality of Steel Sheets
Tensile Strength of Steel Sheets

At least one of the parts to be welded to be spot welded, that is, the steel sheets, is made a high strength steel sheet with a tensile strength of 980 MPa or more. If the tensile strength is less than 980 MPa, the value of the tensile residual stress generated at the weld zone is also low, so the problem of delayed fracture does not easily occur. For this reason, a set of sheets including at least one steel sheet having a tensile strength of 980 MPa or more is covered by the welding method of the present invention. Further, the upper limit of the tensile strength of the high strength steel sheet is not particularly prescribed.

The set of sheets includes not only cases where all of the steel sheets are ones with tensile strengths of 980 MPa or more, but also cases where just one has the above tensile strength. For example, it also includes the case of welding together a steel sheet having a tensile strength of 980 MPa or more and a steel sheet having a tensile strength of less than 980 MPa.

Types and Chemical Compositions of Steel Sheets

The types and chemical compositions of the steel sheets are not particularly limited. The chemical compositions of the steel sheets may be suitably selected to be able to secure tensile strength (980 MPa or more) in the above-mentioned high strength steel sheets. Further, the carbon equivalents Ceq of the steel sheets are not particularly limited. 0.20 mass % or more may be illustrated. Here, Ceq=C+Si/24+Mn/6. This was based on the Ceq of WES.

Thicknesses of Steel Sheets

The thicknesses of the steel sheets are not particularly limited and may be made 0.5 to 3.2 mm in range. Even if the thicknesses are less than 0.5 mm, the effect of improvement of the resistance of the weld zone to delayed fracture is obtained, but the stress load on the weld zone at the time of a tensile test is low and, further, the value of the tensile residual stress occurring at the weld zone is low, so delayed fracture does not easily occur. Further, even if the thicknesses are over 3.2 mm, the effect of improvement of the resistance of the weld zone to delayed fracture is obtained, but reducing the weight of the members sometimes becomes difficult.

Surface Treatment Films of Steel Sheets

The plurality of steel sheets may include one or more steel sheets formed with surface treatment films on one or both surfaces of at least the welded parts. "Surface treatment films" include plating films. Further, they may be deemed to include paint films etc. as well. As the plating film, for example, there are galvanization, aluminum plating, zinc-nickel plating, zinc-iron plating, zinc-aluminum-magnesium plating, etc. As the type of the plating, there are hot dip coating, electroplating, etc.

Form of Steel Sheets

The form of the steel sheets need not be sheet shapes as a whole so long as at least the welding locations are sheet shaped. For example, the steel sheets include flange parts of members press-formed into specific shapes with trapezoidal cross-sections. The number of steel sheets overlapping is not limited to two and may be three or more. Further, the types, chemical compositions, and thicknesses of the steel sheets may all be the same or may be different from each other. Further, the steel sheets are not limited to ones formed from separate steel sheets. They may also be comprised of single steel sheets formed into tubular shapes or other predetermined shapes and overlapping at the ends.

Spot Welding

A plurality of steel sheets were spot welded by using electrodes to clamp the welding locations of the plurality of steel sheets, pressing the electrodes against them while supplying current to form molten metal, and removing heat by water-cooled electrodes and conducting heat to the steel sheets themselves after finishing supplying current so as to rapidly cool the molten metal to solidify the metal and form a nugget of an elliptical cross-sectional shape between the steel sheets.

The conditions of this spot welding are not particularly limited. For example, the electrodes may be made ones of the dome radius types with tip diameters of 6 to 8 mm, the pressing force may be made 1.5 to 6.0 kN, the welding time may be made 0.1 to 1.0 second (5 to 50 cycles, power frequency 50 Hz), and the supplied current may be made 4 to 15 kA. The nugget diameter can be made $3.0\sqrt{t}$ to $8.0\sqrt{t}$ where the thickness of the thinnest steel sheet is "t" (mm).

The basic pressing and current supply pattern at the time of spot welding is not particularly limited. It is possible to set the above ranges of the pressing force, welding time, and supplied current, then suitably adjust them to optimum conditions in accordance with the parts to be welded. The basic pressing and current supply pattern may be made conditions where the required nugget size can be realized and spatter does not occur. The optimum conditions change depending on the strengths, thicknesses, etc. of the steel sheets. Note that, rather than immediately making the current value at the time of start of supply of current the supplied current, it is also possible to make the current value gradually increase (upslope) from 0 (zero) or a low current of over 0 until the current value becomes the supplied current.

Cooling Time Tc, Supplied Current Ic During Cooling Time

After the elapse of the welding time in the spot welding, the value of the supplied current is lowered while maintaining the pressing force of the welding electrodes. The current is made a low one of an extent by which the molten metal solidifies and the weld zone is cooled. This cooling time tc is not particularly limited. It is sufficient that the weld metal (nugget) be formed. While depending also on the thicknesses of the steel sheets, 0.04 to 0.4 second may be illustrated.

The supplied current Ic during the cooling time has to satisfy $0 \leq Ic \leq I1$. At the time of impact treatment, the temperature of the steel sheets has to become a certain value or less (about 800° C. or less). If the temperature of the steel sheets is too high, reduction of the tensile residual stress of the weld zone becomes difficult. Therefore, after the main supply of current for melting the steel sheets, Ic is lowered to less than I1 to cool the steel sheets and thereby make the molten metal solidify and obtain a certain value or more of yield strength. Due to this, it becomes possible to reduce the tensile stress of the weld zone or impart compressive residual stress to the weld zone by the subsequent impact treatment. Ic is preferably not more than 0.2 time I1.0 (kA) is most preferable.

Peening

The peening performed after the spot welding comprises supplying the current I2 to the welding electrodes while repeating at least two times the pressing force raising and lowering cycle of applying a pressing force P2 to the steel sheets by the welding electrodes during the pressing time tf, then immediately applying a pressing force P3 during the pressing time ti and finally applying the pressing force P2 during the pressing time tf, then releasing the pressing force and ending the supply of current.

Supplied Current I2, Welding Time t2

During the peening, current is supplied to the welding electrodes. The supplied current I2 at that time is made one satisfying the above (2). The temperature of the weld zone in the peening becomes suitable, plastic deformation of the weld zone becomes easy, and the tensile residual stress of the weld zone is reduced.

Further, the supplied current I2 is made less than the supplied current I1 at the time of spot welding so as to suppress the enlargement of the nugget at the time of peening. If allowing the nugget to enlarge while performing the peening, sometimes the solidification of the nugget becomes unstable, spatter occurs, the weld zone becomes sunken, and energy becomes wasted.

To sufficiently maintain the yield strength of the steel sheets at the time of imparting pressing force, I2 is preferably made not more than 0.8 time I1. Making it not more than 0.7 time I1 is further preferable. By making I2 such a value, it is possible to reliably make the temperature of the weld zone when applying the pressing force 800° C. or less. If the temperature of the weld zone becomes 800° C. or more, in that temperature region, the yield strength of the steel sheets becomes lower. The absolute value of the residual stress is strongly correlated with the yield strength, so due to a fall in the yield strength of the steel sheet, the compressive stress able to be introduced at the time of impact ends up falling. As a result, the amount of heat shrinkage of the weld zone in the subsequent cooling process becomes larger and a high tensile stress is liable to be introduced to the weld zone. Further, plastic deformation of the surface layers of the steel sheets becomes easy, the depressions formed by the impact treatment become excessive, and the joint strength is liable to fall.

Further, I2 is made at least 0.3 time I1. By making I2 such a range, the effect of reduction of the tensile residual stress by peening can be sufficiently obtained.

Further, the welding time t2 at the time of peening was made the time from the start of application of the pressing force P2 to its release. Note that, the current value may be made to gradually increase from Ic (upslope) until the current value becomes the supplied current I2 or the current value may be immediately made the supplied current I2.

Pressing Force P2, Pressing Time Tf

The pressing force P2 at the time of peening is made 1.2 times or more the pressing force P1 at the time of spot welding for reducing the tensile residual stress. Preferably, it is 1.3 times it or more. The upper limit is not particularly limited, but is preferably 2.5 times or less for avoiding excessive pressing of the weld zone. Further, the upper limit of the pressing time tf is made 0.4 second to reduce the tensile residual stress of the weld zone. Preferably, it is 0.2 second. The upper limit is preferably 0.02 second.

The pressing force P2 at the time of peening may be constant or for example may be raised in stages or otherwise changed. The value of P2 may be suitably determined by the balance of strength between the Cu used for usual welding electrodes and the steel of the high temperature parts to be welded.

Pressing Force P3, Pressing Time Ti

The pressing force P3 at the time of peening has to be P3<P2. Due to this, it is possible to raise and lower the pressing force. Preferably, P2/P3≥1.2. The pressing force P3 is preferably made the same extent as the pressing force P1 at the time of spot welding. It is possible to make the pressing force a value lower than P1, but sometimes the increase or decrease of the pressing force cannot be precisely controlled. The pressing time ti is preferably shortened as much as possible from the viewpoint of productivity, so the upper limit is made 0.4 second. The lower limit is made 0.02 second considering the capabilities of the apparatus, that is, the stability of control of the pressing force.

Number of Times of Repetition of Pressing Force Raising and Lowering Cycle

The number of times of repetition of the pressing force raising and lowering cycle (one application of pressure P2 and the next application of pressure P3 being one cycle) is made two times or more. After performing the pressing force raising and lowering cycle two times or more, it is possible to finally apply the pressing force P2 during tf to thereby reduce the tensile residual stress of the weld zone. For this reason, the number of times of repetition of the pressing force raising and lowering cycle is made two times or more. The upper limit of the number of times of repetition is not particularly limited, but is preferably made 20 times so as to shorten the work time.

Further, if the repeated pressing force P2 is within the range of the above formula (3), the pressing forces may all be the same or the pressing forces may be different. If within the range of the above formula (4), the pressing times may all be the same or the pressing times may be different. However, making pressing forces and pressing times in the repeated process all the same is preferable in terms of the work efficiency.

Further, if the repeated application of the pressing force P3 satisfies the relationship of the above formula (5), the pressing forces may all be the same or the pressing forces may be different. If within the range of the above formula (6), the pressing times may all be the same or the pressing times may be different. However, making pressing forces and pressing times in the repeated process all the same is preferable in terms of the work efficiency.

EXAMPLES

Next, examples of the present invention will be explained, but the conditions in the examples are an illustration of conditions employed for confirming the workability and effects of the present invention. The present invention is not limited to this illustration. The present invention can employ various conditions so long as not departing from the gist of the present invention and achieving the object of the present invention.

The galvannealed (GA) steel sheets shown in Table 1 were prepared. Table 2 shows the conditions of the spot welding, while Table 3 shows the conditions of the peening. In each test, two steel sheets of the same steel sheet number were welded to prepare a test piece. Further, in the spot welding, diameter 16 mm, tip 6 mm dome radius type electrodes were used. The number of repetitions "n" shown in Table 3 is the number of cycles when defining application of the pressing force P2 during the pressing time tf and application of the pressing force P3 during the pressing time ti as one cycle. Further, after raising and lowering the pressing force a predetermined number of times, finally a pressing force P2 was applied during the pressing time tf.

TABLE 1

| Steel sheet no. | Sheet thickness (mm) | Steel sheet strength (MPa) |
|---|---|---|
| 1 | 2 | 1520 |
| 2 | 1.6 | 1814 |

TABLE 2

| | | Spot welding (nugget formation) | | | | |
|---|---|---|---|---|---|---|
| Test no. | Steel sheet no. | Pressing force P1 (kN) | Supplied current I1 (kA) | Welding time t1 (cycles) | Supplied current Ic (kA) | Cooling time tc (cycles) |
| 1 | 1 | 3.9 | 7.0 | 20 | 0 | 10 |
| 2 | 1 | 3.9 | 7.0 | 20 | 0 | 10 |
| 3 | 1 | 3.9 | 7.0 | 20 | 0 | 10 |
| 4 | 1 | 3.9 | 7.0 | 20 | 1.0 | 10 |
| 5 | 1 | 3.9 | 7.0 | 20 | 0 | 10 |
| 6 | 2 | 4.9 | 6.5 | 16 | 0 | 10 |
| 7 | 2 | 4.9 | 6.5 | 16 | 0 | 10 |
| 8 | 2 | 4.9 | 6.5 | 16 | 1.0 | 10 |
| 9 | 2 | 4.9 | 6.5 | 16 | 0 | 10 |
| 10 | 2 | 4.9 | 6.5 | 16 | 0 | 10 |
| 11 | 2 | 4.9 | 6.5 | 16 | 0 | 10 |
| 12 | 2 | 4.9 | 6.5 | 16 | 0 | 10 |
| 13 | 1 | 3.9 | 7.0 | 20 | 0 | 10 |
| 14 | 1 | 3.9 | 7.0 | 20 | 0 | 10 |
| 15 | 1 | 3.9 | 7.0 | 20 | 0 | 10 |

TABLE 3

| | | Peaning | | | | | | | | | |
|---|---|---|---|---|---|---|---|---|---|---|---|
| Test no. | Steel sheet no. | Pressing force P2 (kN) | Pressing time tf (cycles) | Pressing force P3 (kN) | Pressing time ti (cycles) | Supplied current I2 (kA) | I2/I1 | Welding time t2 (cycles) | P2/P1 | No. of repetitions "n" | Remarks |
| 1 | 1 | 4.4 | 5 | 3.9 | 1 | 5.0 | 0.7 | 29 | 1.1 | 4 | Comp. ex. |
| 2 | 1 | 5.9 | 5 | 3.9 | 1 | 5.0 | 0.7 | 29 | 1.5 | 4 | Inv. ex. |
| 3 | 1 | 7.8 | 5 | 3.4 | 1 | 5.0 | 0.7 | 29 | 2.0 | 4 | Inv. ex. |
| 4 | 1 | 7.8 | 5 | 3.9 | 1 | 1.0 | 0.1 | 29 | 2.0 | 4 | Comp. ex. |
| 5 | 1 | 7.8 | 5 | 3.9 | 1 | 5.0 | 0.7 | 119 | 2.0 | 1 | Comp. ex. |
| 6 | 2 | 4.4 | 5 | 4.9 | 1 | 4.5 | 0.7 | 23 | 0.9 | 3 | Comp. ex. |
| 7 | 2 | 5.9 | 5 | 4.9 | 1 | 4.5 | 0.7 | 23 | 1.2 | 3 | Inv. ex. |
| 8 | 2 | 8.3 | 5 | 4.9 | 1 | 4.5 | 0.7 | 23 | 1.7 | 3 | Inv. ex. |
| 9 | 2 | 8.3 | 5 | 4.9 | 1 | 1.0 | 0.2 | 23 | 1.7 | 3 | Comp. ex. |

TABLE 3-continued

| | | Peaning | | | | | | | | | |
|---|---|---|---|---|---|---|---|---|---|---|---|
| Test no. | Steel sheet no. | Pressing force P2 (kN) | Pressing time tf (cycles) | Pressing force P3 (kN) | Pressing time ti (cycles) | Supplied current I2 (kA) | I2/I1 | Welding time t2 (cycles) | P2/P1 | No. of repetitions "n" | Remarks |
| 10 | 2 | 8.3 | 5 | 4.9 | 1 | 4.5 | 0.7 | 113 | 1.7 | 1 | Comp. ex. |
| 11 | 2 | 8.3 | 5 | 4.9 | 1 | 4.5 | 0.7 | 65 | 1.7 | 10 | Inv. ex. |
| 12 | 2 | 8.3 | 50 | 0 | 0 | 4.5 | 0.7 | 50 | 1.7 | 1 | Comp. ex. |
| 13 | 1 | 5.9 | 5 | 3.9 | 1 | 5.6 | 0.8 | 29 | 1.5 | 4 | Inv. ex. |
| 14 | 1 | 5.9 | 5 | 3.9 | 1 | 6.3 | 0.9 | 29 | 1.5 | 4 | Inv. ex. |
| 15 | 1 | 5.9 | 5 | 3.9 | 1 | 2.1 | 0.3 | 29 | 1.5 | 4 | Inv. ex. |

Each test piece was subjected to a hydrochloric acid immersion test. In this test, each test piece was immersed in 0.15N hydrochloric acid for 100 hours, then was investigated for the presence of any cracks. The presence of any cracks was determined by cutting a spot welded joint formed by spot welding by a cross-section vertical to the sheet surfaces and passing through the center of the nugget, cutting out a test piece including the nugget from this cut piece, polishing the cut surface, and examining the polished cut surface by an optical microscope. This test was performed for 10 test pieces. The number of cracks at that time was confirmed. Table 4 shows the results of the hydrochloric acid immersion test. A number of cracks among the 10 test pieces of 3 or less was judged as "passing".

TABLE 4

| Test no. | Results of hydrochloric acid immersion test | Remarks |
|---|---|---|
| 1 | 10 | Comparative example |
| 2 | 0 | Invention example |
| 3 | 0 | Invention example |
| 4 | 7 | Comparative example |
| 5 | 8 | Comparative example |
| 6 | 10 | Comparative example |
| 7 | 0 | Invention example |
| 8 | 0 | Invention example |
| 9 | 9 | Comparative example |
| 10 | 6 | Comparative example |
| 11 | 0 | Invention example |
| 12 | 8 | Comparative example |
| 13 | 1 | Invention example |
| 14 | 2 | Invention example |
| 15 | 1 | Invention example |

As shown in Table 4, in Treatment Nos. 2, 3, 7, 8, 11, and 13 to 15 satisfying the present invention, no cracks occurred in the hydrochloric acid immersion test. Spot welded joints excellent in resistance to delayed fracture were obtained.

As opposed to this, in Treatment No. 1, the ratio of the pressing force P2 to P1 was not suitable. In Treatment Nos. 4 and 9, the relationship of the supplied current I2 to the supplied current I1 was not suitable. In Treatment Nos. 5 and 10, the number of repetitions of rise of the pressing force P2 was not suitable. In Treatment No. 6, the pressing force P2 was a value lower than the pressing force P3 and the ratio of the pressing force P2 to P1 was not suitable, while in the Treatment No. 11, the pressing force was not raised and lowered, fracture occurred in the hydrochloric acid immersion test, and a sufficient delayed fracture characteristic was not obtained.

INDUSTRIAL APPLICABILITY

According to the present invention, peening is performed after spot welding, so it is possible to improve the hydrogen embrittlement resistance of a welded joint. Accordingly, the present invention has a high industrial applicability.

REFERENCE SIGNS LIST 1. steel sheet
2. welding electrode
3. nugget
I. supplied current
I1. supplied current at time of spot welding
I2. supplied current at time of peening
Ic. supplied current at time of cooling
P. pressing force
P1. pressing force at time of spot welding
P2. pressing force at time of rise of pressing force
P3. pressing force at time of fall of pressing force
t1. welding time at time of spot welding
t2. welding time at time of peening
tc. cooling time
tf. pressing time at time of rise of pressing force
ti. pressing time at time of fall of pressing force

The invention claimed is:

1. A method of resistance spot welding a plurality of steel sheets with at least overlapping welding locations,
the plurality of steel sheets including at least one steel sheet with a tensile strength of 980 MPa or more,
the method comprising the steps of, in order,
applying a pressing force P1 (kN) to the plurality of steel sheets by welding electrodes while supplying a current I1 (kA);
supplying a current Ic (kA) during a cooling time tc (s), while applying the pressing force P1;
repeating two times or more a pressure force raising and lowering cycle of supplying a current I2 (kA) to the welding electrodes while applying a pressing force P2 (kN) to the plurality of steel sheets by the welding electrodes during a pressing time tf (s), then immediately applying a pressing force P3 (kN) during a pressing time ti (s);
applying the pressing force P2 during the pressing time tf; and
releasing the pressing force and ending the supply of current I2 (kA),
wherein the supplied current Ic satisfies the following formula (1), the supplied current I2 satisfies the following formula (2), the pressing force P2 satisfies the following formula (3), the pressing time tf satisfies the following formula (4), the pressing force P3 satisfies the following formula (5), and the pressing time ti satisfies the following formula (6):

$$0 \leq Ic < I1 \quad (1)$$

$$0.3 \leq I2/I1 < 1.0 \quad (2)$$

$$P2/P1 \geq 1.2 \quad (3)$$

$$tf \leq 0.2 \quad (4)$$

$$P3 < P2 \quad (5)$$

$$ti \leq 0.2 \quad (6).$$

* * * * *